United States Patent [19]

Vincent et al.

[11] 4,216,112

[45] Aug. 5, 1980

[54] PRESSURE-SENSITIVE MICROCAPSULES CONTAINING ALKYLNAPHTHALENE SOLVENT AND PROCESS FOR THEIR PRODUCTION

[75] Inventors: David N. Vincent, Glenview; Cheng H. Chang, Naperville, both of Ill.

[73] Assignee: Champion International Corporation, Stamford, Conn.

[21] Appl. No.: 835,165

[22] Filed: Sep. 21, 1977

Related U.S. Application Data

[60] Division of Ser. No. 500,903, Aug. 26, 1974, Pat. No. 4,071,469, which is a continuation-in-part of Ser. No. 353,809, Apr. 23, 1973, abandoned.

[51] Int. Cl.² .............................................. B01J 13/02
[52] U.S. Cl. ........................................ 252/316; 8/526; 282/27.5; 427/151; 427/152; 428/307; 428/914
[58] Field of Search .................. 252/316, 364; 8/94 R

[56] References Cited

U.S. PATENT DOCUMENTS

| 3,726,804 | 4/1973 | Matsukawa et al. | 252/316 |
| 3,806,463 | 4/1974 | Konishi et al. | 252/316 |
| 3,855,146 | 12/1974 | Saeki et al. | 252/316 |
| 3,875,074 | 4/1975 | Vassiliades et al. | 252/316 |

FOREIGN PATENT DOCUMENTS 2104444  4/1972  France ........................... 428/307

*Primary Examiner*—Richard D. Lovering
*Attorney, Agent, or Firm*—Roylance, Abrams, Berdo & Farley

[57] ABSTRACT

Pressure-sensitive microcapsules containing a solvent composition for use in carbonless copy systems for use in the absence of a halogenated solvent consisting essentially of a combination of a mono-alkyl naphthalene, wherein said alkyl group contains from 1 to 3 carbon atoms per molecule and a di-alkyl naphthalene, wherein each of said alkyl groups in said di-alkyl naphthalene contains from 2 to 4 carbon atoms per molecule, said mono-alkyl naphthalene being present in an amount between about 25 and about 40 percent by weight of the alkylated naphthalenes present in the solvent, and an isocyanate cross-linking agent.

13 Claims, No Drawings

PRESSURE-SENSITIVE MICROCAPSULES CONTAINING ALKYLNAPHTHALENE SOLVENT AND PROCESS FOR THEIR PRODUCTION

This is a division of application Ser. No. 500,903 filed Aug. 26, 1974, now U.S. Pat. No. 4,071,469, which, in turn, is a continuation-in-part of Ser. No. 353,809, filed Apr. 23, 1973, now abandoned.

This invention relates to alkyl naphthalene solvents. More particularly this invention relates to an alkyl naphthalene solvent involving a combination of a mono-alkyl naphthalene and a di-alkyl naphthalene, wherein the solvent is used for solubilizing colorless chromogenic dye-precursor materials and isocyanate cross-linking agents in the production of microcapsules for use in pressure-sensitive record material.

Marking systems involving localized contact between a chromogenic compound and a color-developing substance in areas where a colored marking is desired have found widespread acceptance in a variety of commercial applications. For example, transfer copy systems have been devised wherein a colorless dye-intermediate material, such as crystal violet lactone, is dissolved in an oil and encapsulated in order to form minute droplets of dye-intermediate solution and isolate the dye-intermediate material from an electron-accepting material of the Lewis acid type, such as acid-treated clay, which is provided on a separate receiving sheet. Upon the application of localized pressure, the capsules thereunder are ruptured and the dye intermediate is released and transferred to a receiving sheet thereby resulting in a distinctive mark. Such pressure-sensitive mark-forming systems are described, for example, in U.S. Pat. Nos. 3,418,656 and 3,418,250 to A. E. Vassiliades.

One of the most commonly used dye-precursor materials is crystal violet lactone (CVL) which produces an instant blue image on an acidic co-reactant material, such as acidic clays, phenols, resorcinols and the like. Until recent years, polychlorinated biphenyls (PCB) has been widely used as the dye-precursor solvent for CVL, since PCB is a good solvent for dissolving the dyes and is easily retained in the micro-capsules. However, due to various difficulties with the PCB, its use has been discontinued and various substitutes have been proposed.

U.S. Pat. No. 3,016,308 to Macaulay discloses the use of a 1:1:1 mixture of chlorinated biphenyl-amyl-biphenyl-amylnaphthalene as the solvent for methyl violet butyl ether for use as an encapsulated marking liquid in a coated record sheet. Isopropyl biphenyl has been proposed in U.S. Pat. No. 3,627,581 to Phillips, Jr. as a solvent for CVL which increases the CVL image intensity over that achieved with PCB.

More recently, U.S. Pat. No. 3,806,463 to Konishi et al discloses the use of alkyl naphthalenes as a solvent in a dye composition component of microcapsules for use in carbonless copy paper, as a substitute for the toxic PCB solvent. Patentees disclose alkyl naphthalenes wherein each alkyl group contains from 1 to 4 carbon atoms with the proviso that the total number of carbon atoms in the alkyl groups must be from 4 to 6. Thus, patentees disclose alkyl naphthalenes such as butyl naphthalene, diethyl naphthalene, dipropyl naphthalene, propylmethyl naphthalene, etc.

Various microencapsulation processes have been utilized in the formation of microcapsules that are employed in the manufacture of copy sheets. Thus, processes such as those described in U.S. Pat. Nos. 3,418,250 and 3,418,656 have been suggested, which processes involve the formation of microcapsules by a dilution of an admixture comprising a resin wherein the resin is separated in solid particle from from solution to form the microcapsule walls. Other micro-encapsulation systems involve the phenomenon known as "co-acervation" wherein a liquid-liquid separation is effected in the formation of the capsule walls.

More recently, an encapsulation process has been proposed which involves the formation of an emulsion by admixing an aqueous solution of a water-soluble, polymeric film-forming emulsifying agent possessing hydroxyl groups with an oily material, which contains an oil-soluble, non-polymeric cross-linking agent for the emulsifying agent, in addition to a color-forming dye intermediate material. The cross-linking agent is a polyfunctional isocyanate which interacts with the hydroxyl groups of the polymeric emulsifying agent to form a solid, cross-linked resinous capsule wall which surrounds each of the oily droplets. The isocyanate cross-linking agent is a material such as an adduct of toluene diisocyanate and trimethylol propane. Although alkyl naphthalenes, such as the amylnaphthalene disclosed in the Macaulay patent and the various alkyl naphthalenes disclosed in the Konishi et al patent are suitable solvents for dye intermediate materials, such as crystal violet lactone, such materials are unsuitable for use as the solvent in micro-encapsulation processes involving isocyanate cross-linking agents of the type mentioned previously.

It has been discovered that a solvent composition for use in carbonless copy systems wherein the solvent consists essentially of a combination of a mono-alkyl naphthalene, wherein the alkyl groups contain from 1 to 3 carbon atoms per molecule, and a dialkyl naphthalene, wherein each of the alkyl groups in the dialkyl naphthalene contain from 3 to 4 carbon atoms per molecule, provides not only a solvent having improved dye solubility and dye intensity over the solvents previously proposed, but such solvent provides the solubility for isocyanate cross-linking agents, such as a toluene diisocyanate-trimethylol propane adduct, to permit the utilization of an alkyl naphthalene solvent system for the production of microcapsules involving such isocyanate cross-linking agents.

As will be hereinafter demonstrated, the monobutyl naphthalene and higher naphthalenes of Macaulay and Konishi et al provide inadequate solubility on a commercial basis for isocyanate cross-linking agents, such as the toluene diisocyanate-trimethylol propane adduct, while the solvent system of the present invention, such as that including mono-isopropyl naphthalene in combination with diisopropyl naphthalene provides a highly suitable solvent for such isocyanates.

The alkyl naphthalene solvent of the present invention when used alone, and in the absence of a halogenated solvent, such as PCB, has far superior properties as a CVL solvent in a record system as compared with PCB. For example, whereas the color intensity obtained in the oil phase consisting of a 1.7% CVL in a 2:1 mixture of isopropyl biphenyl and saturated hydrocarbon oil is 16% higher than that achieved with a 2:1 mixture of PCB (42% chlorine content) and saturated hydrocarbon oil. It has now been found that the alkyl naphthalenes of the present invention yield 60% greater intensities than those of PCB at a 2.1 CVL concentration.

Another chromogenic dye precursor that is used in the art of pressure-sensitive copy systems is benzoyl leuco methylene blue (BLMB). The color formation of BLMB on acidic clay or silica gel is very slow. Under normal conditions it takes about 6 days to develop to a constant intensity. As will be hereinafter demonstrated, the color intensity obtained using 1.8% BLMB in the oil phase of the alkyl naphthalene solvent composition of the present invention is 85% greater than that produced by 1.8% BLMB in PCB or a 2:1 mixture of PCB and coconut oil. The previously suggested isopropyl biphenyls provide only 35% higher intensity over the PCB. This faster development of the BLMB image enhances the instant CVL image when BLMB and CVL are used in combination. It was still further surprising to discover that the final intensity of the BLMB image produced in the alkyl naphthalenes of the present invention was 44% greater than that produced in PCB, while isopropyl biphenyls displayed only a 20% higher intensity. Thus, the alkyl naphthalenes of the present invention greatly improve the color production efficiency of pressure-sensitive record material.

As previously indicated, the solvent of the present invention consists essentially of a mono-alkyl naphthalene wherein the alkyl groups contain from 1 to 3 carbon atoms per molecule, and a dialkyl naphthalene, wherein each of the alkyl groups in the dialkyl naphthalene contains from 2 to 4 carbon atoms per molecule. Thus, the mono-alkyl naphthalenes have the formula

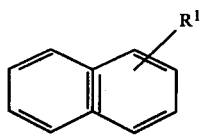

wherein $R^1$ represents an alkyl group having from 1 to 3 carbon atoms.

Accordingly, the mono-alkyl naphthalenes of the present invention include methyl, ethyl and isopropyl naphthalenes. The mono-alkyl derivatives may be the alpha or beta isomer, or a mixture of both isomers. When $R^1$ is a 3 carbon atom alkyl group, $R^1$ may be either n-propyl or isopropyl, with isopropyl being the especially preferred mono-alkyl naphthalene of the present invention.

The dialkyl naphthalenes of the present invention may be single isomers of di-alkylated naphthalenes or a mixture of di-alkylated isomers. Accordingly, suitable dialkyl naphthalenes have the formula

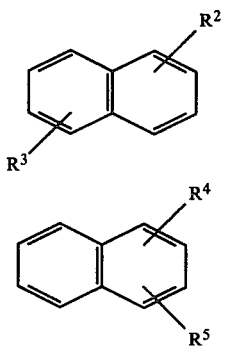

wherein $R^2$, $R^3$, $R^4$ and $R^5$ each represent an alkyl group having from 2 to 4 carbon atoms per molecule.

Preferred dialkyl naphthalenes include diethyl naphthalenes, diisopropyl naphthalenes, di-sec-butyl naphthalenes, isopropyl methyl naphthalenes, and the like.

An especially preferred dialkyl naphthalene is diisopropyl naphthalene.

Suitable amounts of mono-alkyl naphthalenes in the solvent composition of the present invention include between about 25 and about 40% by weight of the solvent, preferably between about 30 and about 35% by weight. The remaining portion of the solvent is substantially dialkyl naphthalene, with no more than about 10% by weight of the solvent being tri-alkyl naphthalenes or the like. Accordingly, a preferred solvent consists of 30–35% mono-isopropyl naphthalene, 55–60% diisopropyl naphthalene and the remainder being triisopropyl naphthalene, in an amount, for example, of about 5% by weight.

As previously indicated, the alkyl naphthalene solvent of the present invention may be suitably used as a solvent for various isocyanate cross-linking agents, as well as dye precursor solvents. Thus, according to the present invention, a preferred method for the production of microcapsules comprises admixing:

(A) a solvent composition wherein the solvent consists essentially of a combination of a monoalkyl naphthalene, wherein the alkyl group contains from 1 to 3 carbon atoms per molecule, and a dialkyl naphthalene wherein each of the alkyl groups in the dialkyl naphthalene molecule contains from 2 to 4 carbon atoms per molecule, the solvent composition containing an oil-soluble, non-polymeric, polyfunctional isocyanate cross-linking agent selected from the group consisting of 4,4'-diphenyl methane diisocyanate, triphenyl methane triisocyanate, adducts of said compounds with polyhydric alcohols, and the adduct of toluene diisocyanate with a polyhydric alcohol; and (B) an aqueous solution of an organic, polymeric emulsifying agent containing a plurality of hydroxyl groups.

The admixing of the solvent composition with the aqueous solution of the emulsifying agent is conducted under conditions to form an oil-in-water emulsion, wherein the solvent composition is dispersed in the form of emulsion droplets in an aqueous continuous phase. The cross-linking agent interacts with the hydroxyl groups of the polymeric emulsifying agent to form a solid cross-linked resinous capsule wall surrounding each of the solvent composition droplets.

A preferred isocyanate cross-linking agent is an adduct of toluene diisocyanate with glycerol (3:1 molar), pentaerythritol (4:1 molar), hexanetriol (3:1 molar) or trimethylol propane (3:1 molar). An especially preferred isocyanate cross-linking agent is the adduct of toluene diisocyanate and trimethylol propane.

Suitable hydroxyl group-containing polymers include polyvinyl alcohol, methylcellulose, starch and benzyl-substituted starches. Polyvinyl alcohol is the preferred emulsifying agent.

The alkyl naphthalenes of the present invention are preferably utilized as solvents for CVL and BLMB. Additionally, the present solvents are useful, for example, for other chromogenic compounds, such as Rhodamine B lactone; diaryl phthalides, e.g., Malachite green lactone; leucoauramines, e.g., leucoauramine and N-benzoyl leucoauramine; caumarins, e.g., 7-diethylamino-4-methylcaumarin; and fluorans, e.g., 6- chloro-7-methyl-3-diethylaminofluoran and 6,8-dimethyl-3-diethylaminofluoran.

Any suitable amount of the alkyl naphthalene solvent of the present invention may be used for dissolving the chromogenic dye-precursor material. For example, in the case of CVL and/or BLMB, between about 0.9 and about 5.0, preferably between 1.5 and about 4.0 parts by weight of the blue image yielding chromogenic materials, based upon 100 parts by weight of the naphthalene solvent.

The microcapsules may be coated on or incorporated in a web or substrate, such as paper, and utilized in any form of pressure-sensitive copy system wherein the microcapsules are ruptured under localized pressure to release the dye precursor-containing alkyl naphthalenes for contact with an acidic co-reactant. Thus, for example, the microcapsule-bearing substrate may also be coated with the acidic co-reactant, such as an acidic clay. Such system is normally referred to as a "self-contained" or "autogenous" system, since the colorless chromogenic material and the acidic co-reactant are present on the same surface of the substrate. Alternatively, the microcapsules containing the alkyl naphthalenes of the present invention may be coated onto and/or incorporated into a substrate which is used in combination with a separate sheet or substrate which is coated with the acidic co-reactant. This type of copy system is normally referred to as a "transfer copy system", and upon rupture of the capsules by localized pressure the dye precursor contacts a separate acid-type coated sheet upon which a colored mark is thereby provided.

The halogen-free alkyl naphthalene oils of the present invention may be utilized in any copy system where they are isolated along with the dye precursor from the acid co-reactant prior to formation of the desired colored image. Any of the well-known acidic materials including bentonite, kaolin, acidic clays, talc, aluminum silicate, calcium citrate, metal oxides, metal chlorides, or the like may be utilized as acidic co-reactants for the chromogenic compounds.

The invention will be further illustrated by the following Examples. The percentages are by weight unless otherwise specified.

EXAMPLE 1

In order to demonstrate the solubility of the isocyanate cross-linking agents of the present invention in various alkyl naphthalenes, four beakers are provided, each containing, respectively, mono-isopropyl naphthalene, monobutyl naphthalene, mono-amylnaphthalene, and di-isopropyl naphthalene. Next, equal portions of an adduct of toluene diisocyanate and trimethylol propane (commercially available as Mondur CB-75 from Mobay Chemical Company) are added to each of the beakers with agitation, and the solubility of the isocyanate cross-linking agent in each solvent is measured. The results are set forth in Table I below:

Table I

| Alkyl Naphthalene | Solubility Of Isocyanate Adduct % (w/w) |
| --- | --- |
| mono-isopropyl naphthalene | greater than 80 |
| mono-butyl naphthalene | 7.4 |
| mono-amylnaphthalene | 4.1 |
| diisopropyl naphthalene | 4.5 |

As seen by the results in Table I, there is a dramatic solubility break between mono-isopropyl naphthalene and the remaining alkyl naphthalenes. As will be hereinafter demonstrated, this dramatic solubility property of the monopropyl and lower mono-alkyl naphthalenes permits the use of such alkyl naphthalenes in a solvent in microencapsulation systems wherein the isocyanate cross-linking agents of the present invention could not ordinarily be employed.

EXAMPLE 2

Six grams of an adduct of toluene diisocyanate and trimethylol propane that is taken from storage are added to 100 grams of an alkyl naphthalene solvent that is 35% by weight mono-isopropyl naphthalene, 60% by weight di-isopropyl naphthalene and 5% by weight triisopropyl naphthalene. The resulting solution is emulsified in 214 grams of an aqueous solution of polyvinyl alcohol (7% by weight) and a Waring blender under agitation in order to form oil-in-water emulsion droplets having an average particle diameter of about 5 microns. The emulsion is heated at 60° C. for two hours, allowed to cool to room temperature, and then 10 grams of melamine formaldehyde condensate added.

This results in discrete, pressure-rupturable microcapsules having walls of excellent structural integrity, which microcapsules may be coated onto a sheet of paper to form a suitable carbonless copy paper.

The foregoing procedure is repeated with different portions of the identical adduct of toluene diisocyanate and trimethylol propane, but mono-butyl naphthalene, mono-amylnaphthalene and di-isopropyl naphthalene are each substituted for the isopropyl naphthalene mixture. In each case, the alkyl naphthalene provided insufficient solubility for the toluene diisocyanate-trimethylol propane adduct and the resulting microcapsules were clearly inferior to those produced employing the isopropyl naphthalene mixture.

Upon storage, the toluene diisocyanate-trimethylol propane adduct slowly polymerizes with age and increase in molecular weight. Additionally, moisture in the atmosphere will hydrolyze the adduct, and these factors cause a decrease in solubility of such material in a solvent. Accordingly, a solvent having a minimum of 10% solubility for the isocyanate is required in order to compensate for such aging factors and permit the utilization of such isocyanate cross-linking agents for the production of microcapsules on a commercial basis where the isocyanate is not necessarily freshly prepared and therefore capable of being solubilized to the extent shown in Table I above.

The following Examples demonstrate improved color intensities obtained with chromogenic compounds conventionally utilized in carbonless copy paper systems, as compared with those solvent materials previously suggested.

EXAMPLE 3

Six grams of an adduct of toluene diisocyanate and trimethylol propane (commercially available as Mondur CB-75 from Mobay Chemical Company) are added to 100 grams of chlorinated biphenyl (48 percent chlorine) and containing 2.1% crystal violet lactone. The resulting solution is emulsified in 214 grams of an aqueous solution of polyvinyl alcohol (7% by weight) in a Waring blender under agitation in order to form oil-in-water emulsion droplets having an average particle diameter of about 5 microns. The emulsion is heated at 60° C. for 2 hours, allowed to cool to room temperature, and then 10 grams of melamine-formaldehyde condensate added. The resulting microcapsular dispersion is coated onto a sheet of paper to provide a dried coat weight of about 4 pounds per ream (a ream being 3300 square feet). The diffuse reflection density of the CVL image is measured after 2 minutes and found to be 0.50.

EXAMPLE 4–10

The procedure of Example 1 is repeated with the exception that the oils set forth in Table 1, below are substituted for the chlorinated biphenyl. The results are set forth in Table I.

Table II

| Example No. | Oils | Intensity[1] (after 2 minutes) |
| --- | --- | --- |
| 4 | PCB (48% chlorine content) | 0.50 |
| 5 | Isopropyl biphenyl | 0.74 |
| 6 | 1-methyl naphthalene | 0.79 |
| 7 | 2-ethyl naphthalene | 0.81 |
| 8 | Isopropyl naphthalene | 0.82 |
| 9 | Diisopropyl naphthalene | 0.77 |
| 10 | Isopropyl naphthalene mixtures (mono-/di/tri- in the ratio of 35/60/5) | 0.83 |

[1]Diffuse Reflection Density, as measured by a MacBeth Densitometer employing a yellow filter, of an impact image produced by dropping a weight of 6¾ ounces from a height of 10⅜ inches over an area of ¼ inch in diameter (7.7 ft-lbs/sq.in.) on the opposite side of the capsule-coated paper to produce an image on the clay-coated paper.

As seen from the results of Table II the isopropyl naphthalene mixture of the present invention not only provides a 60% greater intensity as compared with the previously utilized chlorinated biphenyl at a 2.1% CVL concentration, but also has a greater intensity than either the isopropyl naphthalene of Example 8 or the diisopropyl naphthalene of Example 9 of which the mixture is composed. Accordingly, the foregoing examples demonstrate that the isopropyl naphthalene mixture of the present invention not only provides the required solubility for use in microencapsulation systems employing the isocyanate cross-linking agents of the present invention, but also provides greater color intensities.

EXAMPLE 11

The procedure of Example 3 is repeated with the exception that 1.8% of benzoyl leuco methylene blue (BLMB) is substituted for the 2.1% CVL. BLMB is a slower color-forming chromogenic compound and the intensity of the BLMB image is measured at 6 hours and again after 10 days. After 6 hours, the intensity is found to be 0.215, and the final intensity is 0.323.

EXAMPLES 12–18

The procedure of Example 11 is repeated with the exception that various other oils including those of the present invention are substituted for the chlorinated biphenyl. The results of these experiments are set forth in Table III, below:

Table III

| Example No. | Oils | Intensity[1] after 6 hours | Final Intensity |
| --- | --- | --- | --- |
| 12 | PCB (48% chlorine content) | 0.215 | 0.323 |
| 13 | Isopropyl biphenyl | 0.292 | 0.387 |
| 14 | Methyl naphthalene | 0.390 | 0.477 |
| 15 | Ethyl naphthalene | 0.395 | 0.460 |
| 16 | Isopropyl naphthalene | 0.403 | 0.469 |
| 17 | Diisopropyl naphthalene | 0.330 | 0.427 |
| 18 | Isopropyl naphthalene mixture (mono-/di/tri- in the ratio of 35/60/5) | 0.347 | 0.450 |

[1]Diffuse Reflection Density, as measured by a MacBeth Densitometer employing a yellow filter, of an impact image produced by dropping a weight of 6¾ ounces from a height of 10⅜ inches over an area of ¼ inch in diameter (7.7 ft-lbs/sq.in.) on the opposite side of the capsule-coated paper to produce an image of the clay-coated paper.

As seen from the results of Table III, the color intensity obtained from 1.8% BLMB in the oil phase of the isopropyl naphthalene mixtures of example 18 is significantly greater than that produced by 1.8% of the BLMB in the PCB of Example 12 or the isopropyl biphenyl of Example 13. Additionally, the color intensity of the isopropyl naphthalene mixture of example 18 is greater than the previously proposed diisopropyl naphthalene solvent of Example 17.

This invention has been described in considerable detail with particular reference to preferred embodiments, but it will be understood that variations and modifications can be effected within the spirit and scope of the invention as described in the appended claims.

What is claimed is:

1. A process for the production of microcapsules which comprises admixing:
   (A) a solvent composition for use in the absence of a halogenated solvent wherein the solvent consists essentially of a combination of a mono-alkyl naphthalene, wherein said alkyl group contains from 1 to 3 carbon atoms per molecule, and a di-alkyl naphthalene, wherein each of said alkyl groups in said di-alkyl naphthalene contains from 2 to 4 carbon atoms per molecule, said mono-alkyl naphthalene being present in an amount between about 25 and about 40 percent by weight of the alkylated naphthalenes present in said solvent, said solvent composition containing an oil-soluble, polyfunctional isocyanate cross-linking agent selected from the group consisting of the adducts of 4,4'-diphenyl methane diisocyanate, triphenyl methane triisocyanate and toluene diisocyanate with polyhydric alcohols; and
   (B) an aqueous solution of an organic, polymeric emulsifying agent containing a plurality of hydroxyl groups, comprising polyvinyl alcohol, methylcellulose, starch or benzyl-substituted starch, said admixing being conducted under conditions to form an oil-in-water emulsion, wherein said solvent composition is dispersed in the form of emulsion droplets in an aqueous continuous phase, said cross-linking agent interacting with the hydroxyl groups of said polymeric emulsifying agent to form a solid, cross-linked resinous capsule wall surrounding each of said solvent composition droplets.

2. The process of claim 1 wherein said composition contains between about 30 and about 35% by weight of said mono-alkyl naphthalene.

3. The process of claim 1 wherein said alkyl naphthalene is mono-isopropyl naphthalene and said dialkyl naphthalene is diisopropyl naphthalene.

4. The process of claim 1 wherein said composition contains below about 10% by weight of material other than mono- and di-alkyl naphthalenes.

5. The process of claim 1 wherein said solvent composition contains a color-forming agent.

6. The process of claim 5 wherein said color-forming compound is a dye precursor material.

7. The process of claim 6 wherein said dye precursor material is crystal violet lactone.

8. Pressure-sensitive microcapsules containing a solvent composition for use in the absence of a halogenated solvent wherein said solvent consists essentially of a combination of a mono-alkyl naphthalene, wherein said alkyl group contains from 1 to 3 carbon atoms per molecule, and a di-alkyl naphthalene, wherein each of said alkyl groups in said di-alkyl naphthalene contains from 2 to 4 carbon atoms per molecule, said mono-alkyl naphthalene being present in an amount between about 25 and about 40 percent by weight of the alkylated naphthalenes present in said solvent, the walls of said microcapsules being formed from the reaction product of an oil-soluble, polyfunctional isocyanate cross-linking agent and polyvinyl alcohol, methylcellulose, starch or benzyl-substituted starch.

9. The microcapsules of claim 8 wherein said composition contains between about 30 and about 35% by weight of said mono-alkyl naphthalene.

10. The microcapsules of claim 8 wherein said mono-alkyl naphthalene is mono-isopropyl napthalene and said di-alkyl napthalene is diisopropyl naphthalene.

11. The microcapsules of claim 8 wherein said solvent composition contains below about 10% by weight of material other than mono- and di-alkyl naphthalenes.

12. The microcapsules of claim 8 wherein said composition contains a color-forming compound.

13. The microcapsules of claim 12 wherein said color-forming compound is a dye precursor material.

* * * * *